(12) United States Patent
Lahr et al.

(10) Patent No.: US 10,563,744 B2
(45) Date of Patent: Feb. 18, 2020

(54) DAMPER ASSEMBLIES FOR ENGINE DISCONNECT CLUTCHES OF MOTOR VEHICLE POWERTRAINS

(71) Applicant: GM Global Technology Operations LLC, Detroit, MI (US)

(72) Inventors: Derek F. Lahr, Howell, MI (US); Chunhao J. Lee, Troy, MI (US); Farzad Samie, Franklin, MI (US); Norman K. Bucknor, Troy, MI (US); Dongxu Li, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/214,888

(22) Filed: Dec. 10, 2018

(65) Prior Publication Data

US 2019/0107187 A1 Apr. 11, 2019

Related U.S. Application Data

(62) Division of application No. 15/617,710, filed on Jun. 8, 2017, now Pat. No. 10,260,613.

(51) Int. Cl.
*F16D 41/12* (2006.01)
*F16H 45/02* (2006.01)
(Continued)

(52) U.S. Cl.
CPC ............... *F16H 45/02* (2013.01); *B60K 6/20* (2013.01); *B60K 6/40* (2013.01); *F16D 41/08* (2013.01); *F16D 41/125* (2013.01); *F16D 41/16* (2013.01); *F16H 41/24* (2013.01); *F16H 2045/0205* (2013.01); *F16H 2045/0252* (2013.01)

(58) Field of Classification Search
CPC .. F16H 45/02; F16H 41/24; F16H 2045/0205; F16H 2045/0252; B60K 6/20; B60K 6/40; F16D 41/16; F16D 41/08; F16D 41/125
See application file for complete search history.

(56) References Cited

U.S. PATENT DOCUMENTS 9,121,454 B2 * 9/2015 Pawley ............... F16D 11/16
2009/0247307 A1 * 10/2009 Ishikawa ........... F16F 15/12373
464/68.8

(Continued)

*Primary Examiner* — David J Hlavka
(74) *Attorney, Agent, or Firm* — Quinn IP Law (57) ABSTRACT

Disclosed are damper assemblies for engine disconnect devices, methods for making such damper assemblies, and motor vehicles with a disconnect device for coupling/decoupling an engine with a torque converter (TC). A disconnect clutch for selectively connecting an engine with a TC includes a pocket plate that movably mounts to the TC. The pocket plate includes pockets movably seating therein engaging elements that engage input structure of the TC and thereby lock the pocket plate to the TC. A selector plate moves between engaged and disengaged positions such that the engaging elements shift into and out of engagement with the TC input structure, respectively. A flex plate is attached to the engine's output shaft for common rotation therewith. A damper plate is attached to the pocket plate for common rotation therewith. Spring elements mate the damper and flex plates such that the damper plate is movably attached to the flex plate.

20 Claims, 3 Drawing Sheets

(51) Int. Cl.
*F16D 41/08* (2006.01)
*F16D 41/16* (2006.01)
*F16H 41/24* (2006.01)
*B60K 6/40* (2007.10)
*B60K 6/20* (2007.10)

(56) References Cited

U.S. PATENT DOCUMENTS

2016/0096857 A1* 4/2016 Varanasi .................. C07H 1/08
 435/234
2018/0355923 A1* 12/2018 Samie .................... F16D 41/125

* cited by examiner

DAMPER ASSEMBLIES FOR ENGINE DISCONNECT CLUTCHES OF MOTOR VEHICLE POWERTRAINS

CLAIM OF PRIORITY AND CROSS-REFERENCE TO RELATED APPLICATION

This application is a divisional of U.S. patent application Ser. No. 15/617,710, which was filed on Jun. 8, 2017, is now allowed, and is incorporated herein by reference in its entirety and for all purposes.

INTRODUCTION

The present disclosure relates generally to motor vehicle powertrains. More specifically, aspects of this disclosure relate to disconnect devices for operatively disengaging internal combustion engines from torque converters.

Current production motor vehicles, such as the modern-day automobile, are originally equipped with a powertrain that operates to propel the vehicle and power the onboard vehicle electronics. In automotive applications, the powertrain is generally typified by a prime mover that delivers driving power to the vehicle's final drive system (e.g., rear differential, axle, and wheels) through a manually or automatically shifted multi-speed power transmission. Automobiles have traditionally been powered by a reciprocating-piston type internal combustion engine (ICE) assembly because of its ready availability and relatively inexpensive cost, light weight, and overall efficiency. Such engines include compression-ignited (CI) diesel engines, spark-ignited (SI) gasoline engines, two, four and six-stroke architectures, and rotary engines, as some non-limiting examples. Hybrid and full-electric vehicles, on the other hand, utilize alternative power sources to propel the vehicle and minimize/eliminate reliance on an engine for power.

Hybrid vehicle powertrains utilize multiple traction power sources to propel the vehicle, such as an ICE assembly operating in conjunction with a battery-powered or fuel-cell-powered motor. A hybrid electric vehicle (HEV), for example, stores both electrical energy and chemical energy, and converts the same into mechanical power to drive the vehicle's road wheels. The HEV is generally equipped with an electric machine (E-machine), such as one or more electric motor/generators, that operate in parallel or in series with an internal combustion engine. Since hybrid vehicles are designed to derive their power from sources other than the engine, engines in HEVs may be turned off, in whole or in part, while the vehicle is propelled by the alternative power source(s). A full electric vehicle (FEV)—colloquially known as "all-electric" vehicles—is an alternative type of electric-drive vehicle configuration that altogether eliminates the internal combustion engine and attendant peripheral components from the powertrain system, relying solely on electric tractive motors for vehicle propulsion.

Vehicle powertrains employing an automatic transmission commonly interpose a hydrodynamic torque converter between the internal combustion engine and the multi-speed transmission to govern the transfer of rotational torque therebetween. Replacing the mechanical clutch of a manual transmission, a standard torque converter includes a fluid impeller that is coupled to the engine's output shaft, and a turbine that is coupled to the transmission's input shaft, and a stator interposed between the impeller and turbine to regulate fluid flow between their respective fluid volumes. A hydraulic pump modulates hydraulic fluid pressure within the torque converter housing to regulate the transfer of rotational energy from the impeller to the turbine. Hydraulic fluid may be bled from the housing to increase slip or otherwise operatively disengage the engine crankshaft from the transmission input shaft and to multiply torque (e.g., function as a pseudo-reduction gear) to offset significant differences between input and output speeds.

A torque converter (TC) may generally be typified as a fluid coupling that allows the engine to selectively transmit power to the drivetrain system for vehicle propulsion, and allows the crankshaft to spin—without the engine stalling—when the vehicle wheels and transmission gears come to a stop. For instance, if the engine is rotating slowly, e.g., when the vehicle is braking to a stop or idling at a stop light, hydraulic pressure between the impeller and turbine is reduced such that the amount of torque passed through the torque converter to the transmission is very small. In so doing, the vehicle may be kept still with light pressure on the brake pedal. To accelerate the vehicle, the TC pump increases internal fluid pressure, thereby causing increased amounts of torque to be transmitted from the impeller through the turbine to the transmission for launching the vehicle. For manual transmissions, the torque converter is typically replaced with a driver-operated clutch engaged and disengaged by a foot pedal.

Some torque converters are equipped with a clutch mechanism that functions to rigidly connect the engine crankshaft to the transmission input shaft when their speeds are nearly equal, e.g., to avoid unwanted slippage and resultant efficiency losses. System "slip" occurs because the rotational speed of the impeller relative to the turbine in the torque converter is inherently different. A large slip percentage between the engine output and the transmission input affects the fuel economy of the vehicle; employing a torque converter clutch (TCC) helps to reduce the slip between the engine and the transmission. The TCC operates to mechanically lock the impeller at the output of the engine to the turbine at the input of the transmission so that the engine output and transmission input rotate at the same speed. Application of the TCC may be controlled by an electronic controller to modify clutch engaging forces under certain operating conditions, for example, during shifts to eliminate undesired torque fluctuations and engine speed changes during transient periods when torque flow interruption is desired.

SUMMARY

Disclosed herein are damper assemblies for engine disconnect devices, methods for making and methods for operating such damper assemblies, and motor vehicles equipped with an internal combustion engine that is operatively coupled to/decoupled from a hydrokinetic torque converter via an intermediate disconnect device with a damper assembly. By way of example, and not limitation, there is presented a novel engine disconnect clutch with torsional damper assembly that is disposed between the engine output and the torque converter input. In a more specific example, a positive-engagement selectable one-way clutch (SOWC) is placed between the engine crankshaft and torque converter pump. The SOWC includes a tuned-spring damper assembly fabricated with a flex plate that is mechanically coupled to the crankshaft upstream from the SOWC's clutching mechanism. Damping springs mechanically engage the flex plate with a damper plate of the damper assembly. This damper plate is mechanically coupled, e.g., via circumferentially spaced bolts, to a pocket plate of the SOWC. The pocket plate, in turn, is rotatably mounted on the TC pump housing and includes engaging elements, such as rotatable pawls, sprags, rollers, needles, etc., that operatively engage the TC pump housing to thereby lock the pocket plate to the torque converter for common rotation therewith. A coaxially aligned selector plate adjacent the pocket plate is rotated to selectively engage and disengage the engaging elements from the TC pump housing. For this example, the damper assembly may be packaged in an unlubricated volume and, thus, designed to run dry.

Attendant benefits for at least some of the disclosed features include an engine disconnect device with torsional damper assembly that helps to diminish torque swings, e.g., below zero for positive torque, to thereby minimize vehicle noise, vibration and harshness (NVH) that can result from backlash during torque reversals. Aspects of the disclosed concepts also help to reduce the impact velocity and other related effects of torque reversals on a SOWC. Disclosed engine disconnect damper assembly designs may also reduce the required travel of the damping elements so as to minimize the overall size and requisite packaging space for the damper assembly. Disclosed disconnect devices and damper assemblies can be incorporated into both manual and automatic transmission architectures.

Aspects of the present disclosure are directed to controllable engine disconnect devices for selectively connecting and disconnecting an internal combustion engine assembly with a hydrokinetic torque converter. Disclosed, for example, is a disconnect clutch for selectively connecting an engine assembly with a torque converter. The disconnect clutch includes a pocket plate that movably attaches to the torque converter, e.g., rotatably mounted on the TC pump cover. This pocket plate includes a series of pockets, e.g., circumferentially spaced along the perimeter of the pocket plate. A plurality of engaging elements, which may be in the nature of pawls, sprags, rollers, etc., engage the pockets with the input structure to thereby lock the pocket plate to the torque converter for common rotation therewith. In an example, each engaging element is a spring-biased pawl rotatably seated in a respective one the pocket plate pockets. Alternatively, the engaging elements may be movably attached to the TC and operable to engage and disengage the pockets in the pocket plate.

A selector plate, which is packaged adjacent the pocket plate, selectively moves between engaged and disengaged positions. When the selector plate is in the engaged position, the engaging elements engage and thereby lock together the pocket plate and the torque converter. Conversely, when moved to the disengaged position, the selector plate shifts the engaging elements out of engagement between the pockets and input structure such that the pocket plate can move with respect to the TC. A flex plate packaged adjacent one side of the pocket plate attaches to an output shaft of the engine assembly for common rotation therewith. A damper plate, which is adjacent the flex plate on the opposite side of the pocket plate, e.g., interposed between the flex plate and engine assembly, is attached to the pocket plate for common rotation therewith. Spring elements, which may be sandwiched between the damper plate and pocket plate, mate the damper plate with the flex plate such that the damper and pocket plates are movably attached to and spring-biased with the flex plate.

Other aspects of the present disclosure are directed to motor vehicles equipped with a reciprocating-piston-type internal combustion engine assembly operatively connected to a multi-speed power transmission by a hydrokinetic torque converter. A "motor vehicle," as used herein, may include any relevant vehicle platform, such as passenger vehicles (ICE, hybrid, fuel cell, fully or partially autonomous, etc.), commercial vehicles, industrial vehicles, tracked vehicles, off-road and all-terrain vehicles (ATV), farm equipment, boats, airplanes, etc. A motor vehicle is presented that includes a vehicle body with an engine compartment, and an ICE assembly mounted inside the engine compartment. The ICE assembly includes a crankshaft for outputting torque generated by the ICE assembly to the vehicle drivetrain. A multi-speed transmission receives, selectively modifies, and transmits torque output by the ICE assembly to one or more of the vehicle's drive wheels. A hydrodynamic torque converter selectively connects the ICE assembly to the multi-speed transmission to govern the transfer of torque therebetween.

Continuing with the above example, the motor vehicle also includes a selectable one-way clutch with a pocket plate that is movably mounted to an exterior portion of the torque converter. This pocket plate includes a series of pockets spaced about the pocket plate. Engaging elements selectively engage the pockets with input structure of the torque converter to thereby lock the pocket plate to the TC for common rotation therewith. A selector plate, which is located adjacent the pocket plate, moves between an engaged position, whereat the engaging elements shift into engagement between the pockets and the TC input structure, and a disengaged position, whereat the selector plate shifts the engaging elements out of engagement such that the pocket plate freewheels on the exterior of the torque converter. A flex plate interposed between the pocket plate and ICE assembly is rigidly attached to the engine's crankshaft for common rotation therewith. A damper plate interposed between the flex plate and ICE assembly is rigidly attached to the pocket plate for common rotation therewith. Spring elements, which may be in the nature of helical, leaf, torsional, or other spring types, mate the damper plate with the flex plate such that the damper and pocket plates are movably attached to the flex plate.

Additional aspects of the present disclosure are directed to methods for making and methods for assembling any of the disclosed engine disconnect devices and corresponding damper assemblies. Aspects of the present disclosure are also directed to methods for operating disclosed engine disconnect devices and damper assemblies. Also presented herein are non-transitory, computer readable media storing instructions executable by at least one of one or more processors of one or more in-vehicle electronic control units, such as a programmable engine control unit (ECU) or powertrain control module, to govern operation of a disclosed engine disconnect device.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of illustrative embodiments and representative modes for carrying out the present disclosure when taken in connection with the accompanying drawings and the appended claims. Moreover, this disclosure expressly includes any and all combinations and subcombinations of the elements and features presented above and below.

The present disclosure is amenable to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope of this disclosure as defined by the appended claims.

DETAILED DESCRIPTION

This disclosure is susceptible of embodiment in many different forms. There are shown in the drawings and will herein be described in detail representative implementations of the disclosed concepts with the understanding that these illustrated examples are to be considered an exemplification of the disclosed principles and do not limit the broad aspects of the disclosure to the representative embodiments. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the words "all" and "any" each means "any and all"; and the words "including" and "comprising" and "having" and synonyms thereof mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example.

Figure 1:
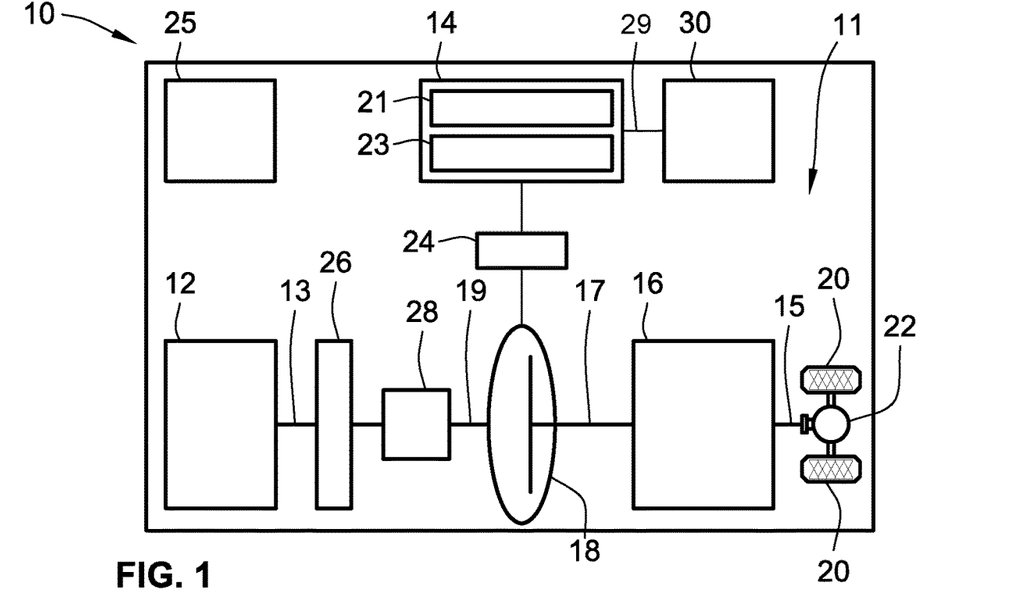
FIG. 1 is a schematic illustration of a representative motor vehicle with a powertrain having a final drive system drivingly connected to an engine assembly by a multi-speed power transmission in accordance with aspects of the present disclosure.

Referring now to the drawings, wherein like reference numbers refer to like features throughout the several views, there is shown in FIG. 1 a schematic illustration of a representative automobile, which is designated generally at 10 and portrayed herein for purposes of discussion as a passenger vehicle with a two-clutch parallel (P2) hybrid-electric powertrain. In particular, the illustrated powertrain is generally composed of a single engine 12 and a single motor 14 that operate, individually or in concert, to transmit tractive power to a multi-speed power transmission 16 through a hydrokinetic torque converter 18 to drive one or more drive wheels 20 of the vehicle's drivetrain 11. The illustrated automobile 10—also referred to herein as "motor vehicle" or "vehicle" for short—is merely an exemplary application with which novel aspects and features of this disclosure can be practiced. In the same vein, implementation of the present concepts into a P2 hybrid-electric architecture should also be appreciated as an exemplary application of the novel concepts disclosed herein. As such, it will be understood that aspects and features of the present disclosure can be applied to other vehicle powertrain configurations and utilized for any logically relevant type of motor vehicle. Lastly, only select components of the vehicle have been shown and will be described in additional detail herein. Nevertheless, the vehicle and powertrain components discussed below can include numerous additional and alternative features, and other well-known peripheral components, e.g., for carrying out the various methods and functions of this disclosure.

The representative vehicle powertrain system is shown in FIG. 1 with a prime mover, such as a restartable internal combustion engine (ICE) assembly 12 that is drivingly connected to a driveshaft 15 of a final drive system 11 by a multi-speed automatic power transmission 16. The engine 12 transfers power, preferably by way of torque via an engine crankshaft 13, to an input side of the transmission 16. As shown, the prime mover 12 directly drives a damper 26 which, in turn, directly drives an engine disconnect device 28. When operatively engaged, the engine disconnect device 28 transmits torque received from the ICE 12 by way of the damper 26 to input structure of the TC 16. The transmission 16, in turn, is adapted to receive, manipulate and distribute power from the engine 12 to the final drive system 11—represented herein by a rear differential 22 and a pair of rear drive wheels 20—and thereby propel the hybrid vehicle. In the example depicted in FIG. 1, the ICE assembly 12 may be any available or hereafter developed engine, such as a 2 or 4-stroke compression-ignited diesel engine or a 4-stroke spark-ignited gasoline or flex-fuel engine, which is readily adapted to provide its available power output typically at a number of revolutions per minute (RPM). Although not explicitly portrayed in FIG. 1, it should be appreciated that the final drive system 11 may comprise any available configuration, e.g., front wheel drive (FWD), rear wheel drive (RWD), four-wheel drive (4WD), all-wheel drive (AWD), etc.

FIG. 1 also displays an electric motor/generator assembly 14 or other E-machine that operatively connects to a main shaft 17 of the electro-hydraulic transmission 16 via the torque converter 18. The motor/generator 14 may be directly coupled onto a TC input shaft 19 or a splined housing portion (e.g., front cover 38 of FIG. 2) of the torque converter 18 via one or more selectively engageable torque transmitting mechanisms 24 (e.g., clutch, brake, etc.). The electric motor/generator 14 is composed of an annular stator 21 circumscribing and concentric with a rotor 23. Electric power is provided to the stator 21 through electrical conductors or cables 29 that pass through the motor housing in suitable sealing and insulating feedthroughs (not illustrated). Conversely, electric power may be provided from the motor 14 to an onboard traction batter pack 30 via regenerative braking. Operation of any of the illustrated powertrain components may be governed by an onboard or remote vehicle controller, such as programmable electronic control unit (ECU) 25. While shown as a P2 hybrid-electric architecture with a single motor in parallel power-flow communication with a single engine assembly, the vehicle 10 may employ other powertrain configurations, including PS, P1, P3, and P4 hybrid powertrains, any of which may be adapted for an HEV, BEV, plug-in, range-extended, or fuel-cell vehicle, as well as full-electric and standard ICE powertrains.

Control module, module, control, controller, control unit, processor and similar terms mean any one or various combinations of one or more of Application Specific Integrated Circuit(s) (ASIC), electronic circuit(s), central processing unit(s) (e.g., microprocessor(s)), and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The ECU can be designed with a set of control routines executed to provide the desired functions. Control routines are executed, such as by a central processing unit, and are operable to monitor inputs from sensing devices and other networked control modules, and execute control and diagnostic routines to control operation of devices and actuators. Routines may be executed at regular intervals, for example each 100 microseconds (μs), 3.125, 6.25, 12.5, 25 and 100 milliseconds during ongoing engine and vehicle operation. Alternatively, routines may be executed in response to occurrence of an event.

Figure 2:
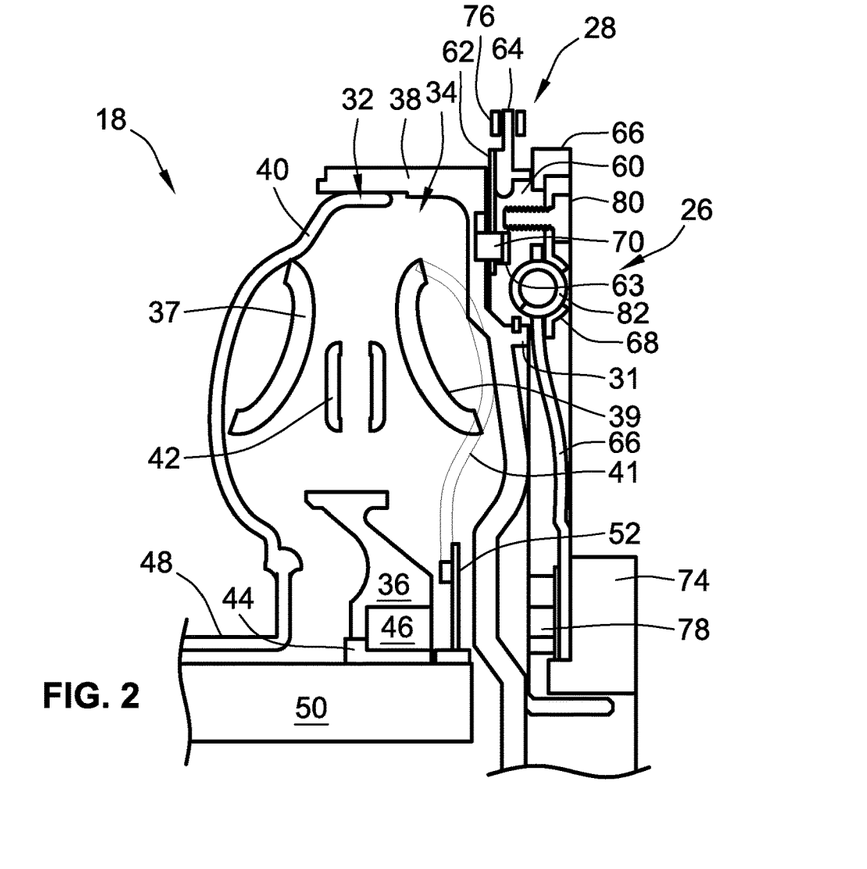
FIG. 2 is a cross-sectional side-view illustration of select portions of a representative hydrodynamic torque converter, engine disconnect clutch, and torsional damper assembly in accordance with aspects of the present disclosure.

FIG. 2 is a cross-sectional side-view illustration of a portion of a representative torque converter assembly 18. Hydrokinetic torque converter assembly 18 is a fluid coupling for operatively connecting and disconnecting the ICE assembly 12 and electric motor/generator assembly 14 with/from the internal epicyclic gearing of the power transmission 16. As shown in FIG. 2, the torque converter assembly 18 is generally comprised of a torque converter impeller 32, a bladed turbine 34, and a relatively stationary stator 36. To protect these components, the torque converter assembly 18 is constructed with an annular housing, defined principally by an engine-side front cover 38 (also referred to herein as "pump housing") fixedly attached, e.g., via electron beam welding, MIG or MAG welding, laser welding, and the like, to a transmission-side pump shell portion 40 such that a working hydraulic fluid chamber is formed therebetween. The impeller 32—also referred to in the art as "pump"—is situated in serial power-flow fluid communication with the turbine 34.

Interposed between the impeller 32 and turbine 34 is a stator 36 that selectively alters fluid flow returning from the turbine 34 to the impeller 32 such that returning fluid aids, rather than impedes, rotation of the impeller 32. The transfer of engine torque from the crankshaft 13 to the turbine 34, via the annular housing front cover 38 and impeller 32, is through the operation of hydraulic fluid, such as transmission oil in the TC fluid chamber. More specifically, rotation of impeller blades 37, retained between the pump shell 40 and an inner shroud 42, causes the hydraulic fluid to be directed toroidally outward toward the turbine 34. When this occurs with sufficient force to overcome the inertial resistance to rotation, turbine blades 39, which are coaxially oriented with the impeller blades 37 and retained between the inner shroud 42 and a turbine shell 41, begin to rotate with the impeller 32. The fluid flow exiting the turbine 34 is directed back into the impeller 32 by way of the stator 36. The stator 36, located between the flow exit section of the turbine 34 and the flow entrance section of the impeller 32, redirects the fluid flow from the turbine 34 to the impeller 32 in the same direction as impeller rotation, thereby reducing pump torque and causing torque multiplication.

Figure 3:
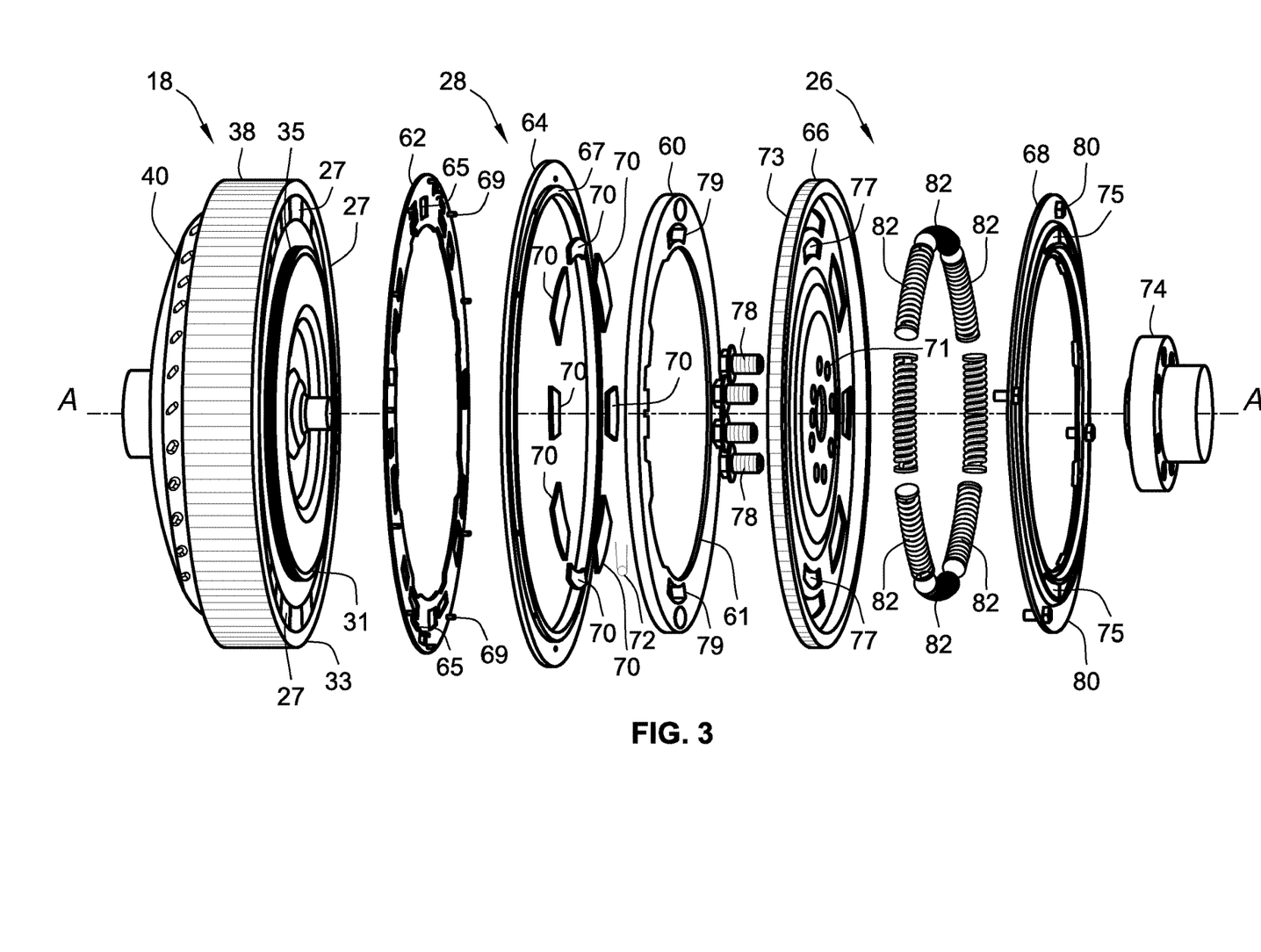
FIG. 3 is a partially exploded perspective-view illustration of the representative hydrodynamic torque converter, engine disconnect clutch, and torsional damper assembly of FIG. 2.

The stator 36 of FIG. 2 may be connected to a stator shaft 44 by way of a roller clutch 46 that is operable to prevent rotation of the stator 36 at low torque converter speeds. At higher torque converter speeds, the direction of hydraulic fluid leaving the turbine 34 changes, causing the stator 36 to over-run the roller clutch 46 and rotate freely on the stator shaft 44. The impeller 32 is secured to a pump hub 48, whereas the turbine 34—namely turbine blades 39 and turbine shell 41—is rotatably mounted onto a TC output shaft 50. As shown, a turbine hub 52 is disposed between, and configured to operatively couple together the turbine 34 and the TC output shaft 50. The turbine hub 52 is shown secured to the turbine shell 41, for example, by a series of rivets, and engages the TC output shaft 50, for example, by a splined interface Fundamentally, as the internal combustion engine 12 turns off to on, on to off, and operates at different rotational speeds during transient modes, it may produce torque-related vibrations and oscillations (colloquially known as "torsionals"). By way of example, when fuel is being fed to the engine 12 and it is under power, e.g., through engagement of the fuel throttle (not shown herein) during normal operation, the engine 12 may produce torsionals that are undesirable to transmit to, and through the transmission 16. In addition, when the engine 12 is not being fueled or is not under power (e.g., in a startup and/or a shutdown operation), the engine pistons may generate compression pulses. Both the torsionals and compression pulses can produce resultant vibrations, noise and rattle that may be sensed by a vehicle occupant. To help reduce or otherwise cancel out the torsionals, torque swings and compression pulses that may be produced by the engine 12, the vehicle 10 is equipped with an engine disconnect damper assembly 26, as shown in FIGS. 1-3. As will be described in detail below, the damper assembly 26 generally functions to isolate the torque converter 18 and, thus, the transmission 12 from unwanted torsionals generated by the engine 12, and also to selectively aide the motor/generator assembly 14 in canceling engine compression pulses during startup and shutdown operations.

According to the representative example illustrated in FIGS. 2 and 3, the engine disconnect device 28 is generally comprised of a pocket plate 60, a selector plate 62, and a selector ring 64 that is generally interposed between and concentrically aligned with the pocket and selector plates 60, 62. In the same vein, the damper assembly 26 of FIGS. 2 and 3 is generally comprised of a flex plate 66 and a damper plate 68, with the flex plate 66 interposed between and concentrically aligned with the pocket and damper plates 60, 68. The pocket plate 60 is a disk-shaped annulus that movably attaches and, when desired, selectively locks the engine disconnect device 28 and, indirectly, the damper assembly 26 to the torque converter 18. By way of non-limiting example, the TC pump housing 38 is integrally formed with a generally cylindrical hub portion 31 that projects orthogonally from a disk-shaped flange portion 33. Pocket plate 60 can be seen in FIG. 2 rotatably mounted onto the hub portion 31 of the pump housing 38 such that the torque converter 18 and engine disconnect device 28 are coaxially aligned to both rotate about axis A-A. To operatively align and retain the pocket plate 60, the TC pump housing 38 may be fabricated with an annular slot 35 that extends continuously around the outer periphery of the hub portion 31; an inner periphery of the pocket plate 60 is provided with a central ring 61 that concentrically aligns with and slidably seats within this annular slot 35.

Engine disconnect device 28 is portrayed herein for purposes of discussion as a positive-engagement, pawl-type selectable one-way clutch (SOWC). Alternatively, the engine disconnect device 28 may take on other available constructions, such as selectable roller or needle clutches, controllable mechanical diode clutches, and sprag clutch designs, as a few non-limiting examples. This disclosure contemplates that other selectable, reversible and multi-mode torque transmitting devices could be used to effectuate the features of the present disclosure. Pocket plate 60 of FIG. 3, for example, is fabricated with a sequence of circumferentially spaced pockets 63 (one of which is visible in FIG. 2) that are recessed into an aft-facing, transmission-side surface of the plate 60. Each pocket 63 movably nests therein a respective engaging element that functions to engage with torque-receiving input structure of the torque converter 18, and cooperatively lock the pocket plate 28 to the torque converter 18 such that the two rotate in unison. According to the representative architecture of FIGS. 2 and 3, each engaging element is composed of a spring-biased pawl 70 that is rotatably seated within a respective one of the aforementioned pockets 63. Each pawl 70 is provided with a respective biasing member 72, which can be a torsion spring, a coil spring, constant force spring, or any other element capable of providing lift to one end of the engaging element.

The torque-receiving input structure of the torque converter 18 is generally comprised of circumferentially spaced notches 27 that are individually recessed into the engine-side, fore-facing surface of the pump housing's flange portion 33. This series of notches 27 is radially aligned with the pockets 63 in the pocket plate 60, each shaped and sized to receive therein a pawl 70. The pawls 70 engage the pump housing 38—thereby locking the pocket plate 60 to the torque converter 18 for common rotation therewith—by protruding rearward (leftward in FIGS. 2 and 3) into and pressing against the notches 27. Conversely, the pawls 70 selectively disengage the pump housing 38—thereby unlocking the pocket plate 60 from the torque converter 18 to freewheel thereon—by receding into their respective pockets 63 out of contact with the notches 27. It will be apparent that the number, arrangement and geometry of the engaging elements 70 and their corresponding notches 27 can be varied from that which are shown in the drawings depending, for example, on design requirements for the intended application.

To govern the operating status of the engine disconnect device 28 and, thus, the torque-transmitting mechanical coupling between the engine assembly 12 and torque converter 18, the disconnect device 28 is provided with a selector plate 62 and selector ring 64 that cooperatively control the engagement and disengagement of the pawls 70 with/from the TC pump housing 38. The selector plate 62 is a disk-shaped annulus neighboring the pocket plate 60 and coaxially aligned with the torque converter 18 and damper assembly 26 on axis A-A. This selector plate 62 is mounted for rotational movement relative to the pocket plate 60 to transition back-and-forth between an engaged and a disengaged position. When the selector plate 62 is in its engaged position, the engaging elements 70 of the pocket plate 60 are allowed to shift into engagement with the input structure of the torque converter 18, e.g., under the biasing force of the biasing members 72. On the other hand, when the selector plate 62 rotates (e.g., counterclockwise in FIG. 3) to its disengaged position, the plate 62 presses or otherwise shifts the engaging elements 70 out of engagement with the TC input structure. By way of example, and not limitation, the selector plate 62 is machined with a series of circumferentially spaced windows 65, each of which is shaped and sized to receive therethrough a portion of a single pawl 70. Moving the selector plate 62 to the engaged position aligns the windows 65 with corresponding pockets 63 such that the pawls 70 seated therein project through the windows 65 and into the notches 27 of the pump housing 38.

The selector ring 64 of FIGS. 2 and 3 is a disc-shaped component with a centrally located cylindrical hub 67 that is sized to circumscribe and seat therein the SOWC pocket plate 60. When the engine disconnect device 28 is fully assembled, an aft-facing, transmission-side surface of the selector ring 64 sits generally flush against a forward-facing engine-side surface of the selector plate 62, while an inner-diameter surface of the central hub 67 sits generally flush with an outer periphery surface of the pocket plate 60, as best seen in FIG. 2. Circumferentially spaced tabs 69 project from the selector plate 62 into complementary slots in the selector ring 64 to operatively interconnect the two components such that they rotate in unison. A selectively engageable brake mechanism 76 (FIG. 2) is activated by a vehicle controller, such as ECU 25 of FIG. 1, to restrict rotational motion of the selector ring 64 about axis A-A. In so doing, the ring 64 is selectively transitioned back-and-forth from between deactivated and activated positions to thereby move the selector plate 62 between the engaged and disengaged positions, respectively.

An engine flex plate 66, which is immediately adjacent both the pocket plate 60 and damper plate 68 (effectively sandwiched therebetween), mechanically attaches the damper assembly 26 and, indirectly, the engine disconnect device 28 to the torque-transmitting output of the engine assembly 12. According to the representative architecture illustrated in FIGS. 2 and 3, the ICE assembly 12 is equipped with an engine hub 74 that is rigidly mounted to one end of the engine's crankshaft 13. Machined into the flex plate 66 is a circular array of circumferentially spaced fastener holes 71. As seen in FIG. 3, these fastener holes 71 receive therethrough threaded bolts 78 or other fasteners that threadably mate with complementary internally threaded female holes in the engine hub 74 to thereby rigidly couple the flex plate 66 directly to the engine hub 74 to rotate in unison with the crankshaft 13. Flex plate 66 drivingly connects the damper assembly 26, disconnect device 28 and, when desired, the torque converter assembly 16 to the engine's 12 crankshaft 13—by way of engine hub 74—such that rotational power is transferable back-and-forth therebetween. In addition to operating to transmit torque produced by the engine 12 to the transmission 16, the flex plate 66 may also function to absorb thrust loads that may be generated by the torque converter 18 hydrodynamics and/or through operation of the disconnect device 28. Projecting radially outward from an outer diameter (OD) edge of the flex plate body is a succession of gear teeth 73—collectively defining a "starter ring gear"—that operatively engage with gear teeth of an engine starter.

A ring-shaped damper plate 68, which sits generally flush against an engine-side surface of the flex plate 66, circumscribed by the starter ring gear teeth 73, is fixedly attached via hexagonal bolts 80 or other fasteners to the pocket plate 60 for common rotation therewith. In any of the instances in this disclosure where bolts or threaded fasteners are disclosed as a mechanism for connecting two or more components, it should be recognized that other processes may be employed to join those components, such as riveting, welding, forming, etc. Damper plate 68 is shown interposed between and, thus, sandwiched by the engine assembly 12 and the flex plate 66. The damper plate 68 of FIGS. 2 and 3 is also equipped with one or more spring-mass damper systems, also referred to herein as "SDS" and identified as 82 in the drawings. These SDS 82 are shown spaced circumferentially around and positioned proximate to the outer periphery of the damper plate 68.

The SDS 82 mate the damper plate 68 and pocket plate 60 with the flex plate 66 such that the pocket and damper plates 60, 68 are movably attached to the flex plate 66. In accord with the illustrated example, the damper plate 68 is fabricated with half-cylinder-shaped spring receptacles 75 that are equidistantly spaced about the plate 68 body's circumference. While it is envisioned that any logically relevant type of spring element may be employed, the SDS 82 of FIG. 3 each includes a helical spring terminating at each end thereof with a spring retainer. As best seen in FIG. 3, each SDS 82 is seated within a respective one of the spring receptacles 75 such that the length of each helical spring is elongated along the circumference of the plate 68. Defined through the body of the flex plate 66 are circumferentially spaced spring windows 77, each of which receives therethrough a respective one of the SDS helical springs. To this regard, the pocket plate 60 is formed with circumferentially spaced spring channels 79 that are radially aligned with the spring windows 77 in the flex plate 77 such that the SDS helical springs are seated within these channels 79, sandwiched between the pocket plate 60 and damper plate 68. When the flex plate 66 rotates under the driving power of the engine assembly 12, the spring retainers of each SDS 82 are pressed against respective circumferentially spaced walls of the spring windows 77, thereby compressing the springs. This interaction can be used to absorb and dampen unwanted torsionals produced by the engine 12 during normal, startup, transient and shutdown operations, as some non-limiting examples.

Figure 4:
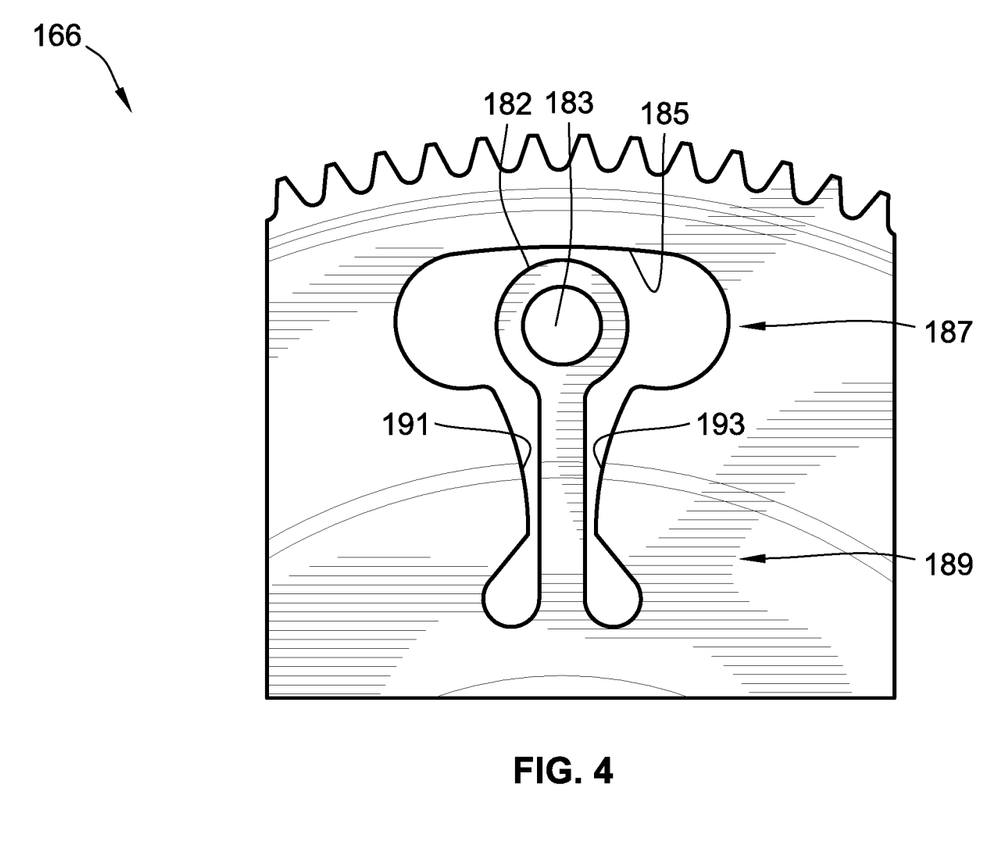
FIG. 4 is an enlarged front-view illustration of a representative flex plate with integrally formed damper leaf springs in accord with aspects of the disclosed concepts.

FIG. 4 provides an enlarged, front-view illustration of an alternative flex plate configuration 166 that supplements or replaces the SDS 82 of FIGS. 2 and 3 with leaf springs for providing spring-biased, torsional-damping mechanical engagement between the flex plate 166 and a damper plate, such as damper plate 68 of FIG. 3. The spring elements of FIG. 4 include numerous diametrically elongated leaf springs 182 that are machined into or otherwise integrally formed with the flex plate 166. These leaf springs 182 are elongated, I-shaped bars that are rigidly attached at only one end thereof to the flex plate 166. Each damper leaf spring 182 includes a fastener eyelet 183 for receiving therethrough a threaded bolt or other fastening means (e.g., hexagonal bolts 80 of FIG. 3) to movably attach the flex plate 166 to a damper plate and a pocket plate.

Defined through the disk-shaped body of the flex plate 166 are circumferentially spaced spring frames 185, each of which surrounds a respective leaf spring 182. These spring frames 185 have a generally T-shaped configuration with a crossbar section 187, which is proximate to and elongated along the outer peripheral edge of the plate 166. An elongated stem section 189 is generally orthogonally oriented with, and projects radially inward from, the crossbar section 187. Stem section 189 includes a pair of opposing cam surfaces 191 and 193 that abut a radially inward portion of the leaf spring 182, when the spring 182 flexes sufficiently to contact these surfaces 191, 193, and thereby restricts a flexure motion of the leaf spring 182. In so doing, these cam surfaces 191 and 193 increase a spring rate of the leaf springs 182, e.g., approximately 1000-3000% from about 3 Nm/deg to about 80 Nm/deg. In other words, the cam surfaces 191, 193 restrict the motion of flexure of the leaf springs 182 to progressively increase its spring rate. Optionally, the leaf springs 182 may be stiffened for out of plane stiffness.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined in the appended claims. Moreover, the present concepts expressly include any and all combinations and subcombinations of the preceding elements and features.

What is claimed:

1. A disconnect clutch for selectively connecting an engine assembly with a torque converter, the engine assembly having an output member, and the torque converter having an input structure to transmit torque with the output member, the disconnect clutch comprising:
    a pocket plate configured to movably attach to the torque converter, the pocket plate including a plurality of pockets;
    a plurality of engaging elements configured to engage the plurality of pockets with the input structure to thereby lock the pocket plate to the torque converter for common rotation therewith; and
    a selector plate adjacent the pocket plate and configured to move between an engaged position, whereat the plurality of engaging elements shift into engagement with the plurality of pockets and the input structure, and a disengaged position, whereat the selector plate shifts the plurality of engaging elements out of engagement between the plurality of pockets and the input structure such that the pocket plate freewheels on the torque converter.

2. The disconnect clutch of claim 1, further comprising a damper assembly including:
    a flex plate configured to drivingly attach to the output member of the engine assembly for common rotation therewith;
    a damper plate adjacent the flex plate and attached to the pocket plate for common rotation therewith; and
    a plurality of spring elements mating the damper plate with the flex plate such that the damper plate is movably attached to the flex plate.

3. The disconnect clutch of claim 2, wherein the plurality of spring elements includes a plurality of leaf springs each rigidly attached at a first end thereof to the flex plate and at a second end thereof to the damper plate.

4. The disconnect clutch of claim 3, wherein each of the leaf springs is integrally formed with and diametrically elongated with respect to the flex plate.

5. The disconnect clutch of claim 3, wherein the flex plate includes a plurality of circumferentially spaced spring frames, and wherein each of the leaf springs is situated within a respective one of the spring frames.

6. The disconnect clutch of claim 5, wherein each of the spring frames includes a pair of opposing cam surfaces configured to abut the respective leaf spring, when flexing, and thereby restrict a flexure motion of the leaf spring.

7. The disconnect clutch of claim 1, wherein the torque converter includes a torque converter housing with a pump cover, a pump shell fixedly attached to the pump cover, and a hub projecting from the pump cover, and wherein the pocket plate is configured to rotatably mount onto the hub of the pump cover.

8. The disconnect clutch of claim 7, wherein the hub projecting from the pump cover includes an annular slot, and wherein the pocket plate includes a central ring configured to concentrically align with and seat in the annular slot.

9. The disconnect clutch of claim 2, wherein the output member of the engine assembly includes an engine hub mounted to one end of an engine crankshaft, and wherein the flex plate includes a plurality of fastener holes configured to receive fasteners that rigidly couple the flex plate directly to the engine hub.

10. The disconnect clutch of claim 1, wherein the plurality of engaging elements includes a plurality of pawls each seated within a respective one of the pockets of the pocket plate.

11. The disconnect clutch of claim 10, wherein the pockets and the pawls are circumferentially spaced around the pocket plate, and wherein the input structure of the torque converter includes a pump cover with circumferentially spaced notches, the pawls engaging the pump cover, to thereby lock the pocket plate to the torque converter, by protruding into and abutting the notches.

12. The disconnect clutch of claim 11, wherein the selector plate includes circumferentially spaced windows, and wherein moving the selector plate to the engaged position aligns each of the windows with a respective one of the pockets such that the pawl seated therein projects through the window and into one of the notches of the pump cover.

13. The disconnect clutch of claim 1, further comprising a selector ring attached to the selector plate and configured to rotate between deactivated and activated positions to thereby move the selector plate between the engaged and disengaged positions, respectively.

14. A motor vehicle comprising:
a vehicle body with a plurality of wheels;
an internal combustion engine (ICE) assembly attached to the vehicle body, the ICE assembly including a crankshaft;
a multi-speed transmission operable to transmit engine torque output by the crankshaft of the ICE assembly to one or more of the wheels;
a hydrodynamic torque converter selectively connecting the ICE assembly to the multi-speed transmission to govern the transfer of torque therebetween, the torque converter including a torque converter housing with a pump cover having an input structure; and
a selectable one-way clutch (SOWC), including:
a pocket plate rotatably mounted onto the torque converter housing, the pocket plate including a plurality of pockets;
a plurality of engaging elements configured to selectively engage the plurality of pockets with the input structure of the pump cover to thereby lock the pocket plate to the torque converter for common rotation therewith; and
a selector plate adjacent the pocket plate and configured to move between an engaged position, whereat the plurality of engaging elements engage the plurality of pockets with the input structure, and a disengaged position, whereat the selector plate shifts the plurality of engaging elements out of engagement between the plurality of pockets and the input structure such that the pocket plate freewheels on the torque converter housing.

15. The motor vehicle of claim 14, further comprising a damper assembly including:
a flex plate adjacent the pocket plate and rigidly attached to the crankshaft of the ICE assembly for common rotation therewith;
a damper plate interposed between the flex plate and the ICE assembly, the damper plate attached to the pocket plate for common rotation therewith; and
a plurality of spring elements mating the damper plate with the flex plate such that the damper plate and pocket plate are movably attached to the flex plate.

16. The motor vehicle of claim 15, wherein the plurality of spring elements includes a plurality of leaf springs each rigidly attached at a first end thereof to the flex plate and at a second end thereof to the damper plate.

17. The motor vehicle of claim 16, wherein each of the leaf springs is integrally formed with and diametrically elongated with respect to the flex plate.

18. The motor vehicle of claim 14, wherein each of the engaging elements includes a pawl seated within a respective one of the pockets, the pawls being circumferentially spaced around the pocket plate, and wherein the input structure of the pump cover includes circumferentially spaced notches, the pawls engaging the pump cover, to thereby lock the pocket plate to the torque converter, by protruding into and abutting the notches.

19. The motor vehicle of claim 18, wherein the selector plate includes circumferentially spaced windows, and wherein moving the selector plate to the engaged position aligns each of the windows with a respective one of the pockets such that the pawl seated therein projects through the window and into one of the notches of the pump housing.

20. The motor vehicle of claim 14, further comprising a selector ring attached to the selector plate and configured to rotate between deactivated and activated positions to thereby move the selector plate between the engaged and disengaged positions, respectively.

* * * * *